Patented Aug. 6, 1929.

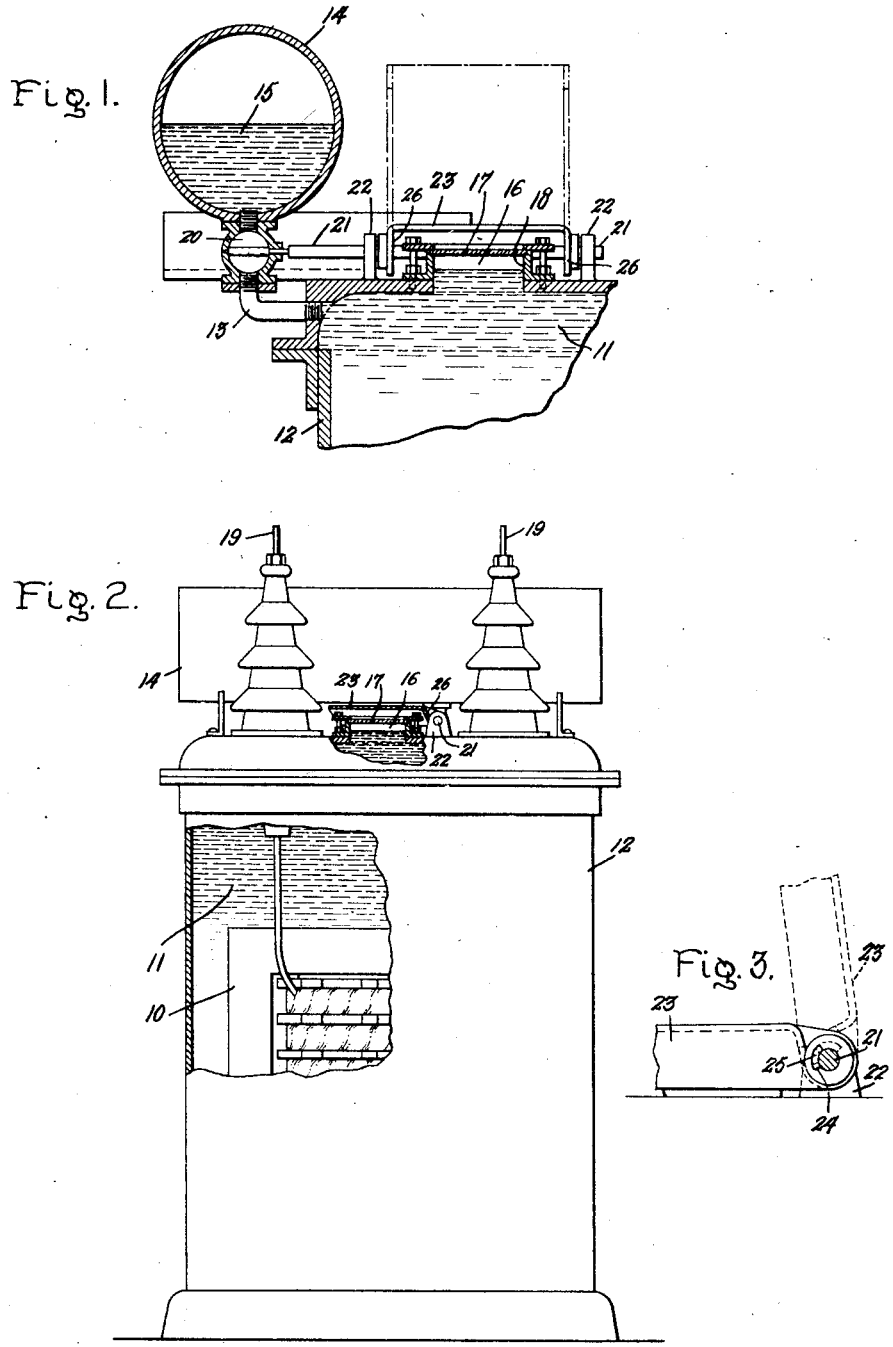

1,723,916

UNITED STATES PATENT OFFICE.

SVEN J. BRUNE, OF PITTSFIELD, MASSACHUSETTS, ASSIGNOR TO GENERAL ELECTRIC COMPANY, A CORPORATION OF NEW YORK.

INCASED ELECTRICAL APPARATUS.

Application filed September 4, 1928. Serial No. 303,631.

My invention relates to incased oil immersed electrical induction apparatus such as transformers and reactors. The casing of a piece of apparatus of this general character, particularly in the larger sizes, is often completely filled with oil and provided with an expansion chamber in communication with the interior of the casing to permit expansion and contraction of the oil as its temperature changes. The expansion chamber is located at a level above that of the top of the casing so that the pressure of the oil under the cover of the casing is greater than the atmospheric pressure and no air can be drawn into the casing to oxidize the oil in case of a leak.

If there is a defect in the insulation or if it is subjected to an excessive voltage, an arc may occur which may dissociate some of the oil and cause a very sudden increase in pressure within the casing. The casing is, therefore, usually provided with an opening large enough to relieve any sudden high internal pressure before it can rupture the casing, the opening being normally closed by a seal which will rupture or yield when the internal pressure reaches some predetermined maximum value. This pressure relief opening should be at least as high as the cover or top of the casing so that no more of the oil in the casing can run out when the seal breaks than is forced or thrown out by the internal pressure. If the opening is not extended much above the cover, however, there is the advantage that it is well spaced from the terminals of the apparatus, but it is below the level of the oil in the expansion chamber. The general object of the present invention is to provide an arrangement whereby the oil in the expansion chamber is effectively prevented from escaping through the pressure relief opening in case the seal normally closing this opening is broken by internal pressure in the casing.

The invention will be better understood from the following description taken in connection with the accompanying drawing in which Fig. 1 is a sectional view of a fragment of a transformer casing provided with an expansion chamber, a normally sealed pressure relief opening and means for preventing escape of the oil in the expansion chamber when the seal is broken; Fig. 2 is a different view, partly in section, of the transformer casing with the expansion chamber, pressure relief opening and means for preventing escape of the oil in the expansion chamber; and Fig. 3 shows a detail of construction.

Like reference characters indicate similar parts in the different figures of the drawing.

The invention is applicable to any incased oil immersed electrical apparatus, such as a transformer or reactor when provided with an expansion chamber and a pressure relief device, and it will be explained as applied to an oil immersed transformer. The transformer 10 shown in the drawing is immersed in a body of insulating oil 11 in a casing 12. The oil 11 is in communication through a pipe connection 13 between the casing 12 and an expansion chamber 14 with a body of oil 15 which partially fills the expansion chamber. The level of the expansion chamber 14 and its oil 15 is above that of the top or cover of the casing 12 so that the casing 12 is kept full of oil at all times and the pressure in this casing is above that of the outside air. Thus, if any leak occurs in the casing 12, no air can be drawn into it to contaminate the oil which it contains and which may be heated to a rather high temperature by the transformer 10.

A pressure relief opening or outlet 16 in the top or cover of the casing 12 is normally closed by a seal 17 which may be a sheet of glass or other material secured to the wall or flange 18 with an oil tight joint. This seal 17 will yield or rupture in response to excessive pressure within the casing 12 and the opening 16 is large enough to relieve such pressure before it can injure the casing. The flange 18 is short so that all parts of the pressure relief structure are near the top of the casing 12 and well spaced from the terminals 19 of the transformer. The opening 16 and its seal 17 are, therefore, below the level of the expansion chamber 14 and its oil 15 so that if the seal 17 is broken the oil 15 is free to run down into the casing 12 and an equal amount will escape through the opening 16 unless prevented in some way.

The pipe 13 is provided with a valve 20 connected to a shaft 21 extending through bearings in supports 22 on the cover of the casing 12. The shaft 21 extends along one side of the opening 16 and carries a plate or cover member 23 by a lost motion connection including a pin 24 fixed to the shaft 21 and extending into a slot 25 in the plate member.

The plate member 23 normally lies over the opening 16 in the path of any gas or oil which may be ejected through this opening by excessive pressure within the casing 12.

Excessive pressure within the casing 12 exceeding a value determined by the strength of the seal 17 will break this seal and gas and oil will be ejected forcibly through the opening 16 and against the plate member 23. This will force the plate member 23 upwardly around the shaft 21 into a position such as is shown in dotted lines in Fig. 3. As the plate member 23 moves, one end of its slot 25 engages the pin 24 so that the shaft 21 is turned with the plate, the valve 20 being turned and closed at the same time by the shaft. This shuts off the oil 15 in the expansion chamber 14 from the casing 12 and greatly reduces the loss of oil through the pressure relief opening 16.

As soon as the force of the ejected oil and gas against the plate member 23 has ceased, this member will drop back into its normal position over the opening 16 to keep out rain, snow or anything which might contaminate the oil until the broken seal is replaced. When the plate member 23 drops back to its normal position, however, it does not turn the shaft 21 with it because of the lost motion connection between these parts. The valve 20 thus remains closed but should be opened again, of course, as soon as the broken seal has been replaced by a new one.

The plate member 23 has depending rear and side edges 26 to direct the oil ejected from the opening 16 more effectively to one side of the casing 12.

The invention has been explained by describing and illustrating a particular form and application thereof, but it will be apparent that changes may be made without departing from the scope of the invention as defined in the appended claims.

What I claim as new and desire to secure by Letters Patent of the United States, is:

1. The combination with a casing for oil immersed electrical apparatus, of an expansion chamber communicating with said casing, a valve between said expansion chamber and said casing, said casing having a normally sealed pressure relief outlet below the normal oil level in said expansion chamber, and a member arranged to be moved by oil ejected through said outlet, said member being connected to said valve to close it when moved by ejected oil.

2. The combination with a casing for oil immersed electrical apparatus, of an expansion chamber communicating with said casing, a valve between said expansion chamber and said casing, said casing having a normally sealed pressure relief outlet below the normal oil level in said expansion chamber, and a member arranged to be moved by oil ejected through said outlet, said member having a lost motion connection with said valve to close it when moved by ejected oil, whereby said member may return to normal position after closing said valve without reopening the valve.

3. The combination with a casing for oil immersed electrical apparatus, of an expansion chamber communicating with said casing, a valve between said expansion chamber and said casing, said casing having a normally sealed pressure relief outlet below the normal oil level in said expansion chamber, and a movable plate member over said outlet and connected to close said valve when moved by ejected oil, said plate member having depending edge portions.

4. The combination with a casing for oil immersed electrical apparatus, of an expansion chamber communicating with said casing, a valve between said expansion chamber and said casing, said casing having a pressure relief outlet below the normal oil level in said expansion chamber, a seal for said outlet, said seal being yieldable to relieve excessive pressure within said casing, and a movable member over said outlet and seal, said member being connected to close said valve when moved by oil ejected through said opening.

5. The combination with a casing for oil-immersed electrical apparatus, of an expansion chamber communicating with said casing, a valve between said expansion chamber and said casing, said casing having a normally-sealed pressure relief outlet below the normal oil level in said expansion chamber, and means for automatically effecting closing of said valve when said relief outlet is opened.

In witness whereof, I have hereunto set my hand this 29th day of August, 1928.

SVEN J. BRUNE.